US011403688B2

(12) United States Patent
Bikumala et al.

(10) Patent No.: US 11,403,688 B2
(45) Date of Patent: Aug. 2, 2022

(54) MACHINE LEARNING BASED PROCUREMENT AS A SERVICE

(71) Applicant: Dell Products L. P., Round Rock, TX (US)

(72) Inventors: Sathish Kumar Bikumala, Round Rock, TX (US); Deepak NagarajeGowda, Cary, NC (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 386 days.

(21) Appl. No.: 16/777,229

(22) Filed: Jan. 30, 2020

(65) Prior Publication Data
US 2021/0241337 A1 Aug. 5, 2021

(51) Int. Cl.
G06Q 30/00 (2012.01)
G06Q 30/06 (2012.01)
G06N 3/04 (2006.01)
G06N 3/08 (2006.01)
G06Q 10/08 (2012.01)
G06F 40/30 (2020.01)
G06Q 10/00 (2012.01)
G06Q 30/02 (2012.01)

(52) U.S. Cl.
CPC ......... *G06Q 30/0621* (2013.01); *G06F 40/30* (2020.01); *G06N 3/0445* (2013.01); *G06N 3/08* (2013.01); *G06Q 10/0837* (2013.01); *G06Q 10/20* (2013.01); *G06Q 30/0282* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS 7,627,503 B1* 12/2009 Champagne ......... G06Q 20/203
705/26.5
2012/0284144 A1* 11/2012 Herbst .................. G06Q 50/08
705/26.5

* cited by examiner

*Primary Examiner* — Mila Airapetian
(74) *Attorney, Agent, or Firm* — Krishnendu Gupta; Deepika Bhayana; Derek Lam

(57) ABSTRACT

As an example, a software application executing on a computing device of a channel partner may access an application programming interface (API) hosted by a server to access a manufacturer's data. The computing device may provide criteria to the API to identify a subset of a set of configurations. The computing device may be used to select a particular configuration in the subset and to perform one or more modifications to the particular configuration to create a modified configuration. The computing device may use the API to access a verification module to verify whether the modified configuration can be built. If the modified configuration is unbuildable, the computing device may be used to make additional modifications to the particular configuration until the modified configuration is verified as buildable. The channel partner may place an order for a particular quantity of the modified configuration.

20 Claims, 10 Drawing Sheets

600

KNN Pseudo code

INPUT: DATASETS R, $R_{K \times \alpha}$
OUTPUT: DATASET $R_F$

BEGIN
$R_F = 0$
FOREACH $X \varepsilon R$ do
    $RES \leftarrow KNN(X, R_{K \times i})$
    IF CLASSIFICATION THEN
        $FIN \leftarrow CLASSIFY(RES)$
    ELSE IF REGRESSION THEN
        $FIN \leftarrow REGRESS(RES)$
    $R_F \leftarrow ADD(s, FIN)$
RETURN $R_F$

FIG. 6

LSTM PSEUDO CODE EXCERPT

```
lstm autoencoder recreate sequence
from numpy import array
from keras.models import Sequential
from keras.layers import LSTM
from keras.layers import Dense
from keras.layers import RepeatVector
from keras.layers import TimeDistributed
from keras.utils import plot_model
# define input sequence
sequence = array([0.1, 0.2, 0.3, 0.4, 0.5, 0.6, 0.7, 0.8, 0.9])
# reshape input into [samples, timesteps, features]
n_in = len(sequence)
sequence = sequence.reshape((1, n_in, 1))
# define model
model = Sequential()
model.add(LSTM(100, activation='relu', input_shape=(n_in,1)))
model.add(RepeatVector(n_in))
model.add(LSTM(100, activation='relu', return_sequences=True))
model.add(TimeDistributed(Dense(1)))
model.compile(optimizer='adam', loss='mse')
# fit model
model.fit(sequence, sequence, epochs=300, verbose=0)
plot_model(model, show_shapes=True,
        to_file='reconstruct_lstm_autoencoder.png')
# demonstrate recreation
yhat = model.predict(sequence, verbose=0)
print(yhat[0,:,0])
```

FIG. 7

MACHINE LEARNING BASED PROCUREMENT AS A SERVICE

BACKGROUND OF THE INVENTION

Field of the Invention

This invention relates generally to procurement and more particularly to using an application programming interface (API) to provide channel partners more control over procurement.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of computing devices, such as Dell®, may provide computing devices (e.g., desktops, laptops, tablets, 2-in-1s, or the like) to numerous channel partners, such as retailers (e.g., Best Buy, Walmart, Costco, and the like). Each channel partner may have limited flexibility in terms of specifying a computing device. For example, for a laptop, a channel partner may specify the screen size, processor, and price. The channel partner cannot specify which components (e.g., Seagate, Western Digital, or Micron disk drive) are used to manufacture the laptop. The channel partner may specify an amount (e.g., 8 GB) of random-access memory (RAM), but the channel partner may not be able to specify whether that amount is one stick of RAM (e.g., 1×8 GB) or two sticks (e.g., 2×4 GB). In addition, the channel partner may have limited sales information. For example, the channel partner may know, based on the channel partner's own sales data, which configurations are most popular with consumers. However, the channel partner may not know what configurations are popular in the market overall, which configurations are popular in areas where the channel partner does not have a presence, and so on.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a software application executing on a computing device of a channel partner may access an application programming interface (API) hosted by a server to access a manufacturer's data. The computing device may provide criteria to the API to identify a subset of a set of configurations. The computing device may be used to select a particular configuration in the subset and to perform one or more modifications to the particular configuration to create a modified configuration. The computing device may use the API to access a verification module to verify whether the modified configuration can be built. If the modified configuration is unbuildable, the computing device may be used to make additional modifications to the particular configuration until the modified configuration is verified as buildable. The channel partner may place an order for a particular quantity of the modified configuration.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 6 illustrates an example of K-Nearest Neighbors (KNN) pseudo code, according to some embodiments.

FIG. 7 illustrates an excerpt of long short term memory (LSTM) pseudo code, according to some embodiments.

DETAILED DESCRIPTION

Figure 1:
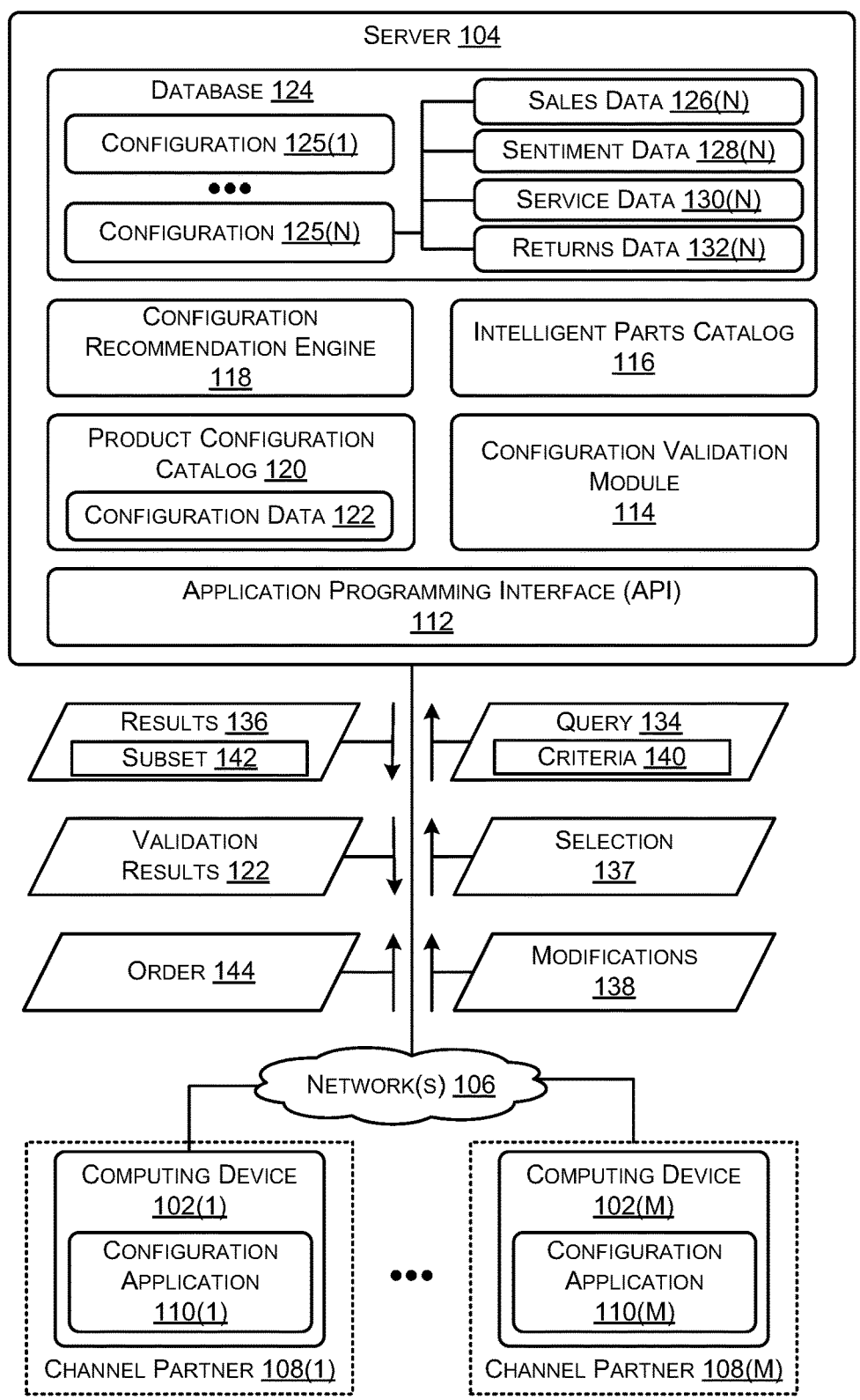
FIG. 1 is a block diagram of a system that includes a server to host an application programming interface (API), according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable multiple channel partners to access, via an application programming interface (API), the manufacturer's sales data and configuration details. The API enables a channel partner to specify criteria (e.g., price range, location, profit margin, and the like) to identify a subset of configurations from a set of available configurations. For example, the criteria may include highest selling configurations (regardless of price or location), highest selling configurations between a price range (e.g., $301 to $500, $501 to $800, above $801), highest selling configurations in a particular location (e.g., city, state, or country), configurations with a highest margin (e.g., profit), and the like. The highest selling configurations may be determined using machine learning, such as, for example, long-short term memory (LSTM), clustering using machine learning (e.g., DBSCAN), and K-nearest neighbors.

The channel partner may analyze their own data regarding product returns and product servicing to determine which parts are causing the most issues. For example, the product returns and product servicing data may indicate that a particular component (e.g., disk drives, RAM, keyboards, display devices, or the like) made by a first manufacturer has more issues than the same component manufactured by one or more other manufacturers. The channel partner may use the product return and product servicing information to modify a selected configuration (e.g., selected based on the criteria) and specify that the particular components made by the first manufacturer not be used to manufacture the product, e.g., to reduce product returns and product service requests.

The channel partner may analyze customer comments on their website to identify desirable features (e.g., thin bezel around display device, low weight for a laptop, and the like) and undesirable features (e.g., too heavy, too thick, no fingerprint reader and the like). For example, the customer comments may include "I loved the laptop but wish it was lighter and had a smaller bezel on the display device to reduce the size" or "I love how light and small the laptop is and the fingerprint reader is a great feature because I don't have to type in a password to unlock the computer." The channel partner may use the information about desirable and undesirable features to modify a selected configuration (e.g., selected based on the criteria) and specify that the particular components be used to manufacture the product configuration, e.g., display device with narrow width bezel, fingerprint reader, camera, low weight components (e.g., plastic or carbon fiber case) and so on.

A verification module may verify that the modified configuration (e.g., as selected and modified by the channel partner) can be built. If the verification module verifies that the modified configuration can be built, then the verification module may indicate this to the channel partner and the channel partner may place an order for a quantity of the modified configuration of the computing device to be manufactured. If the verification module determines that the modified configuration cannot be built, then the verification module may indicate this to the channel partner and offer suggestions as to alternate components to use and the channel partner may further modify the configuration and verify the further modified configuration. The channel partner may repeat the process of modifying the configuration until the modified configuration is verified. The verification module may use an intelligent parts catalog that uses various machine learning models to identify the most similar parts to a particular part to enable the channel partner to substitute similar parts for parts specified in a bill of materials used to manufacture a computing device. The channel partner can use the API and the intelligent parts catalog to substitute more reliable parts (e.g., parts subject to fewer returns and/or service), substitute, and/or add parts based on features that customers have identified as desirable, and substitute and/or remove parts that customers have identified as undesirable.

Thus, each channel partners is provided with access to a larger pool of sales data than just the channel partner's sales data and has more options in terms of configuring a device. In this way, the API enables a channel partner to identify a best-selling laptop configuration based on various criteria, substitute particular parts with more reliable parts (based on the channel partner's product returns and product servicing data), add features that the channel partner's customers find desirable, adjust for features that the channel partner's customers find undesirable, verify that the modified configuration can be built, and then place an order for the modified configuration. The API thus provides much more control over the procurement process for each channel partner.

As an example, a computing device may include one or more processors and one or more non-transitory computer readable media to store instructions executable by the one or more processors to perform various operations. For example, the operations may include accessing an applications programming interface (API) hosted by a server. The operations may include providing, using the API, a set of criteria to filter a set of configurations. For example, the set of criteria may include at least one of: (i) a particular time period comprising a start date and an end date, (ii) a price range comprising a lowest price and a highest price, (iii) a particular location comprising a postal code, a county, a city, a state, or a country, (iv) a profit margin, or (v) a number of units sold. The operations may include receiving, from the API, a subset of the set of configurations. The operations may include the subset determined based at least in part on the set of criteria. The operations may include receiving a selection of a particular configuration of the subset. For example, the particular configuration may be associated with one of a desktop computing device, a laptop computing device, or a tablet computing device, a 2-in-1 computing device. The operations may include receiving a modification to the particular configuration. For example, the modified configuration may specify that a first particular part be excluded from the particular configuration based at least in part on one or more issues associated with the particular part. For example, the one or more issues may be determined based on analyzing service request data and product returns data. The modified configuration may specify that the modified configuration that a second particular part be included in the particular configuration based at least in part on one or more features provided by the second particular part.

The operations may include creating a modified configuration based on the modification. The operations may include requesting, using the API, verification that the modified configuration is buildable. The operations may include determining, using the API, that the modified configuration is buildable. The operations may include placing, using the API, an order to manufacture a particular quantity of the modified configuration.

The operations may include receiving, from the API, a second subset of the set of configurations determined based at least in part on a second set of criteria. The operations may include receiving a second selection of a second particular configuration of the subset. The operations may include receiving a second modification to the second particular configuration. The operations may include creating a second modified configuration based on the second modification. The operations may include requesting, using the API, verification of the second modified configuration. The operations may include determining, from the API, that the modified configuration is unbuildable. The operations may include receiving an additional modification to the second particular configuration. The operations may include creating an additional modified configuration based on the additional modification. The operations may include requesting, using the API, verification of the additional modified configuration. The operations may include determining, from the API, that the additional modified configuration is buildable.

The operations may include determining service requests associated with the particular configuration, determining return data associated with the particular configuration, and determining sentiment data associated with the particular configuration. For example, the sentiment data may be determined based on comments posted on one or more review sites. The modification to the particular configuration may be based at least in part on one or more of: (i) the service requests, (ii) the return data, or (iii) the sentiment data.

As another example, a server may include one or more processors and one or more non-transitory computer readable media to store instructions executable by the one or more processors to perform various operations. For example, the operations may include receiving from a computing device associated with a channel partner, via an applications programming interface (API), one or more criteria to filter a set of configurations. The operations may include determining a subset of the set of configurations. For example, the subset may be determined based at least in part on the one or more criteria. The operations may include receiving, via the API, a selection of a particular configuration of the subset. The operations may include receiving, via the API, a modification to the particular configuration to create a modified configuration. The operations may include determining, using a configuration verification module, that the modified configuration is buildable. The operations may include receiving, via the API, an order to manufacture a particular quantity of the modified configuration. The operations may include performing, using a long short term memory (LSTM) machine learning module, an analysis of the set of configurations to identify a set of features. The operations may include clustering, using density-based spatial clustering of applications with noise (DBSCAN), the set of features to create a plurality of configuration clusters based at least in part on: (i) a number of sales of individual configurations of the set of configurations, (ii) product reviews of the individual configurations, (iii) service request data associated with the individual configurations, and (iv) product return data associated with the individual configurations. The operations may include performing, using a K-nearest neighbors algorithm, an analysis of the plurality of configuration clusters. The operations may include determining, based on the analysis, a predetermined number of bestselling configurations. For example, the subset may include at least one bestselling configuration from the predetermined number of bestselling configurations. The modified configuration may specify that a particular part be excluded from the particular configuration based at least in part on one or more issues associated with the particular part. For example, the one or more issues may be determined based on analyzing service request data and product returns data. The modified configuration may specify that a particular part be included in the particular configuration based at least in part on one or more features provided by the particular part.

FIG. 1 is a block diagram of a system 100 that includes a server to host an application programming interface (API), according to some embodiments. The system 100 includes multiple computing devices 102, e.g., 102(1) to 102(M) (M>0), connected to a server 104 via one or more networks 106. Each of the computing devices 102 may be associated with a particular channel partner 108 of a manufacturer (e.g., Dell®). For example, the computing device 102(1) may be associated with a channel partner 108(1) and the computing device 102(M) may be associated with the channel partner 108(M). Each of the computing devices 102 may execute a corresponding configuration application 110 that accesses an application programming interface (API) 112 hosted by the server 104.

The server 104 may host a configuration validation module 114 that is able to validate whether a particular configuration may be manufactured. The server 104 may include an intelligent parts catalog 116 that is capable of identifying similar parts that are similar to a particular part. For example, the intelligent parts catalog 116 may determine attributes associated with the particular part and then identify similar parts based on the attributes of the similar parts. The intelligent parts catalog 116 may assign a score, based on a comparison of the attributes of the similar parts with the attributes of the particular part, indicating how similar a similar part is to the particular part. For example, if a similar part has a score of 100%, then the similar part may be completely interchangeable with the particular part because the similar part has similar (or the same) electrical characteristics, similar (or the same) physical characteristics, and other similar (or the same) attributes. As another example, if a similar part has a score of 90%, then the similar part may be completely interchangeable except that the similar part may have higher power consumption as compared to the particular part because the particular part may be designed for a laptop computer (e.g., where power consumption is a design consideration) while the similar part may be designed for a desktop computer (e.g., where power consumption is not a design consideration).

The server 104 may include a recommendation engine 118 that is able to recommend one or more configurations. The recommendation engine 118 may access a product configuration catalog 120 that includes configuration data 122 associated with multiple configurations stored in a database 124. For example, the database 124 may include multiple configurations 125(1) to 125(N) (N>1). Each of the configurations 125 may have associated data. For example, the configuration 125(N) may have associated sales data 126(N), sentiment data 128(N), service data 130(N), and returns data 132(N). The sales data 126(N) may indicate how many units of the configuration 125(N) have been sold, including in which locations and when. The sentiment data 128(N) may include data pulled from customer reviews (e.g., associated with the configuration 125(N)) posted on the manufacturer's site, on social media sites (e.g., Facebook), on computer review sites, and the like. The service data 130(N) may include information service requests associated with the configuration 125(N). The returns data 132(N) may include information about how many devices having the configuration 125(N) were returned to the manufacturer due to an issue.

The configuration recommendation engine 118 may filter the set of configurations 125 in the database 124 based on criteria 140 specified by one of the channel partners 108 and return a subset 142 of the configurations 125 that satisfy criteria 140. For example, the criteria 140 may include (i) a particular time period (e.g., one month prior and up to when school/University starts, one month prior and up to Christmas, one month prior and up to Black Friday, and the like), (ii) a price range (e.g., $301 to $500, $501 to $800, $801 to $1000, $1001 and higher or the like), (iii) a particular location (e.g., based on postal code, county, city, state, or country), (iv) highest profit margin as a percentage of the manufacturer's suggested retail price (MSRP), (v) highest profit margin (e.g., not taking into account MSRP), another type of criteria, or any combination thereof. The recommendation engine 118 may identify, based on the criteria 140, a subset 142 of the configurations 125 that includes the most popular selling configurations in the database 124.

For example, the channel partner 108(M) may use the configuration application 110(M) to access the API 112. The channel partner 108(M) may send a query 134 that specifies the criteria 140 to the server 104. Based on the criteria 140, the configuration recommendation engine 118 may filter the product configuration catalog 120 and the configurations 125 in the database 124 to determine the subset 142 of the configurations 125. The channel partner 108(M) may review the subset 142, make a selection 137 of a particular configuration (e.g., the configuration 125(N)) of the subset 142, determine one or more modifications 138 to the particular configuration, and send the modifications 138 to the server 104. The API 112 may use the configuration validation module 114 to determine whether the modifications to the particular configuration (e.g., the configuration 125(N)) are valid (e.g., whether the modified configuration can be built) and send validation results 122 to the channel partner 108(M). If the validation results 122 indicate that the modifications 138 to the particular configuration (e.g., the configuration 125(N)) cannot be performed, the validation results 122 may also include suggestions to the modifications 138 that may enable the particular configuration to be built. The channel partner 108(M) may iteratively repeat the process of providing the modifications 138 and receiving the validation results 122 until the validation results 122 indicate that the modifications 138 to the particular configuration (e.g., the configuration 125(N)) can be built. After the channel partner 108(M) receives the validation results 122 indicating that the modifications 138 to the particular configuration (e.g., the configuration 125(N)) can be built, the channel partner 108(M) may place an order 144 with the manufacture to have a large quantity (e.g., thousands) of the modifications 138 to the particular configuration manufactured.

Thus, each of multiple channel partners may use a configuration application to access an API that enables each channel partner to identify, based on multiple criteria, the most popular (e.g., highest selling) configurations from a set of available configurations. The channel partner may select a particular configuration from the most popular configurations. In some cases, the channel partner may request one or more modifications to the particular configuration. The API may enable the channel partner to verify that the particular configuration with the one or more modifications can be manufactured. After the channel partner specifies modifications to a particular configuration and verifies that such a computing device can be manufactured, the channel partner may place an order to purchase multiple such computing devices. For example, the channel partner may specify components that use recycled materials and the like to create an Environmental, Social, and Governance (ESG) computing device or a low carbon-footprint computing device. If the channel partner has experienced problems with a particular part manufactured by company ABC, then the channel partner may specify that the product is to be assembled using the particular part manufactured by companies other than company ABC. If the channel partner's customers' reviews indicate that customers prefer to perform their own upgrades, then the channel partner may, for example, specify that a single stick of RAM be used in a laptop with two RAM slots, to leave one slot free to enable the customer to add a second stick of RAM.

Figure 2:
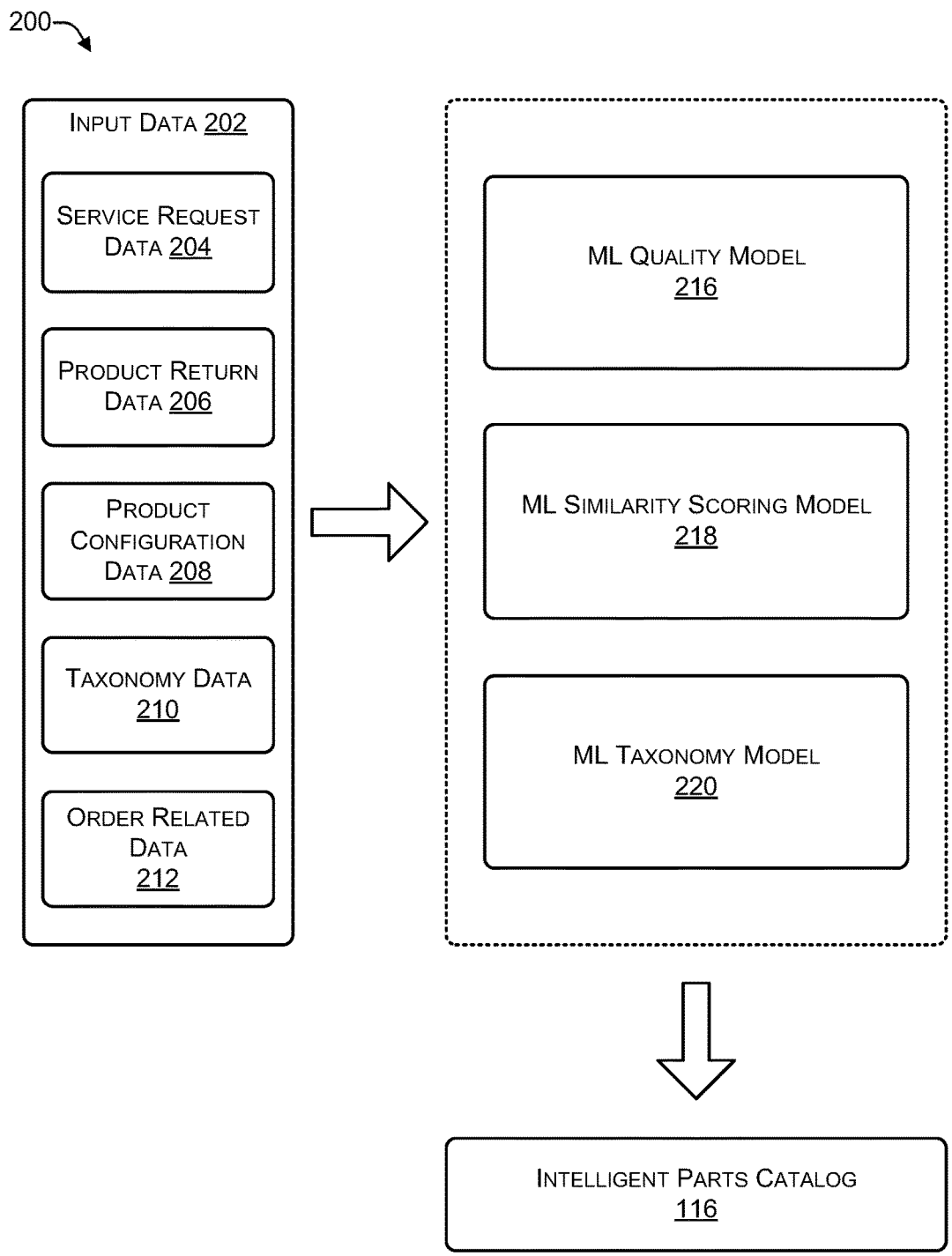
FIG. 2 is a block diagram of a system to create an intelligent parts catalog, according to some embodiments.

FIG. 2 is a block diagram of a system 200 to create an intelligent parts catalog, according to some embodiments. The system 200 illustrates how the intelligent parts catalog 116 may be created.

Input data 202 may include service request data 204, product return data 206, product configuration data 208, taxonomy data 210, and order related data 212 (including, for example, quotes, sales orders, purchase orders, invoices, and bill of materials (BOM). The service request data 204 may identify data associated with service requests initiated by customers to provide service to a particular product. The product return data 206 may include data associated with products that have been returned due to defects or other issues. The product configuration data 208 may include data associated with parts associated with a particular configuration of a product. The taxonomy data 210 may include data associated with a taxonomy of each part in each particular product manufactured by the manufacturer. The order related data 212 may include sales quotes, sales orders, purchase orders, invoices, and bill of materials associated with each part of each particular product.

The input data 202 may be used as input to multiple machine learning models 118. For example, the machine learning models 118 may include a machine learning quality model 216, a machine learning similarity scoring model 218, and a machine learning taxonomy model 220. The input data 202 may be used as training data to create of the machine learning models 216, 218, 220. The machine learning models 216, 218, 220 may be used to create the intelligent parts catalog 116, as described herein.

Figure 3:
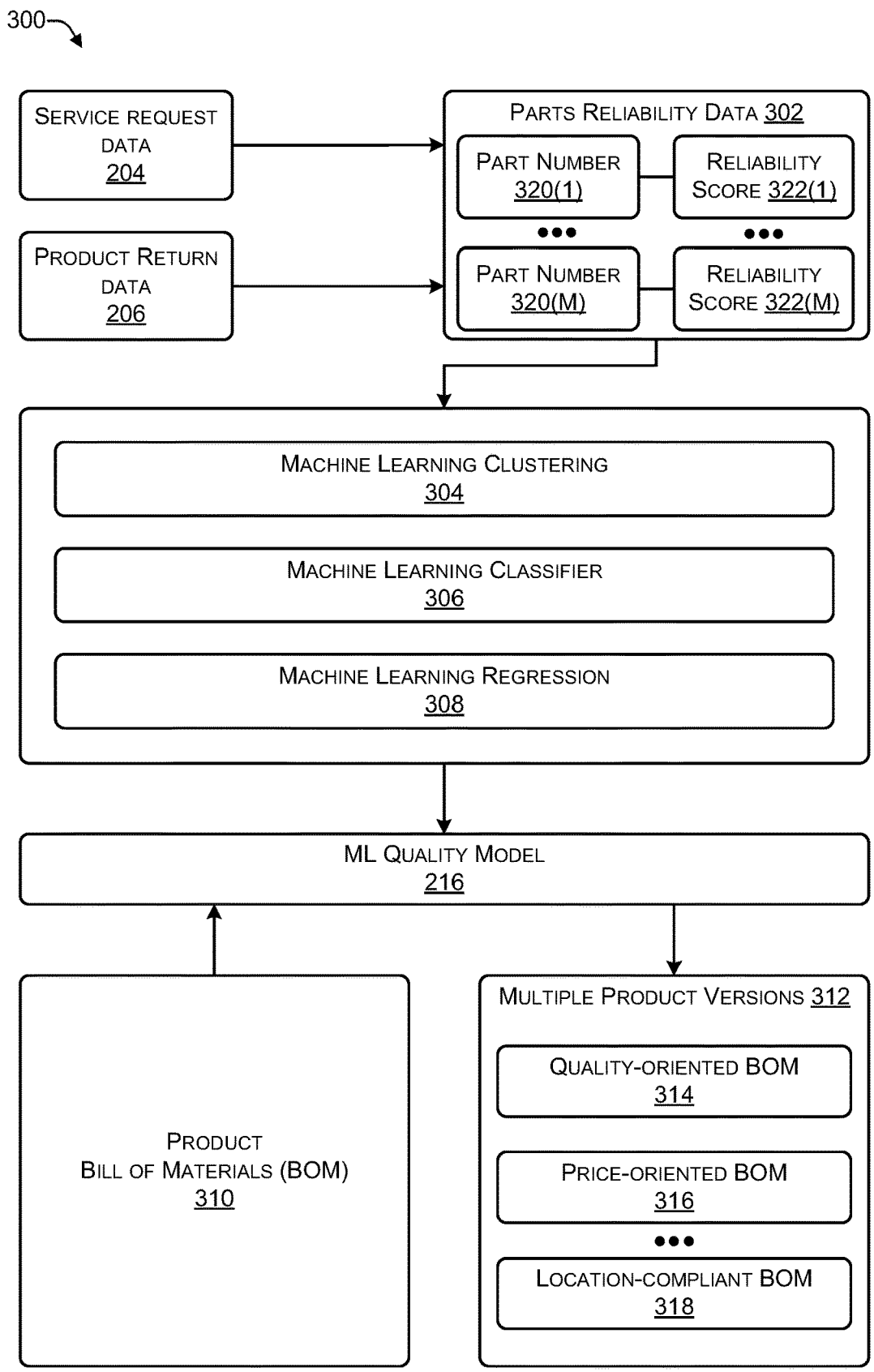
FIG. 3 is a block diagram of a system to determine multiple bill of materials for multiple versions of a product, according to some embodiments.

FIG. 3 is a block diagram of a system 300 to determine multiple bill of materials for multiple versions of a product, according to some embodiments. The system 300 illustrates how the machine learning quality model 216 may be created.

The service request data 204 and the product return data 206 may be used as input to determine parts reliability data 302. For example, parts that caused service requests (e.g., technician is sent to customer location to address product issue) or product returns (e.g., customer returns product due to an issue) may be flagged as having a lower quality whereas other parts that were not subject to service requests or product returns may be flagged as having a higher quality. The parts reliability data 302 may be determined based on how many of a particular part has been used in a product, how many times the particular part has caused a service request, and how many times the particular product has caused a product return. For example, a first part may have been used in 1000 computing devices and the first part may have been responsible for 40 service requests and 60 product returns. The first part may be considered 90% reliable (e.g., (40+60)/1000=10% unreliable). As another example, a second part may have been used in 2000 computing devices and the second part may have been responsible for 100 service requests and 200 product returns. The second part may be considered 85% reliable (e.g., (100+200)/2000=15% unreliable). In this way, the parts reliability data 302 may be normalized by interpolating or extrapolating to enable comparisons between two or more parts.

Machine learning clustering 304 may be used on the parts reliability data 302 to cluster each part based on the reliability associated with each part, e.g., parts with a 99% reliability score in a first cluster, parts with a 98% reliability score in a second cluster, and so on. For example, the machine learning clustering 304 may use K-means clustering, mean shift clustering, density based spatial clustering with noise, expectation maximization clustering using Gaussian mixture models, agglomerative hierarchical clustering, or the like. The machine learning clustering 304 may thus cluster (e.g., group) parts having a same (or similar) reliability score as compared to parts in other clusters.

A machine learning classifier 306 may be used to classify whether a set of parts in a particular cluster are of sufficient reliability to warrant including in a product. For example, parts in clusters with a 95% reliability score or higher may be classified as usable while the parts in the remaining clusters may be classified as unusable. As another example, parts in clusters having a reliability score between 95% and 100% may be classified as extremely reliable, parts in clusters having a reliability score between 90% and 94% may be classified as very reliable, parts in clusters having a reliability score between 80% and 89% may be classified as adequately reliable, and parts having a reliability score below 80% may be classified as unreliable. For example, if a product is being made for a price-conscious market, parts that are classified as very reliable or adequately reliable may be used to save costs. The machine learning classifier 306 may be a type of supervised learning, e.g., learning where a training set of correctly identified observations is available and may be implemented using Naive Bayes, support vector machines, Random Forest, Neural Networks, or the like.

A machine learning regression model 308 (e.g., using linear regression, least squares, or the like) may be used to perform regression to create a quality score for each part in the intelligent parts catalog 116. For example, the quality score may be based on performing clustering using the machine learning clustering 304. The machine learning clustering 304, the machine learning classifier 306, and the machine learning regression 308 may be used to create the machine learning quality model 216.

One use of the machine learning quality model 216 may be to use a product bill of materials 310 (e.g., a bill of materials listing parts used to build a product) as input to produce bill of materials for multiple product versions 312. For example, a quality-oriented bill of materials 314 may identify parts having a relatively high reliability score 322 (e.g., 90% or higher) to create a particular product. A price-oriented bill of materials 316 may identify parts having a lower price than the parts identified in the quality-oriented bill of materials 314. The price-oriented bill of materials 316 may identify parts having a lower reliability score 322 (e.g., 80% or higher) than the parts identified in the quality-oriented bill of materials 314. The location compliant bill of materials 318 may include parts that are compliant with laws or regulations associated with a particular location. For example, a particular location, such as the European Union, may specify that computers sold in the European Union comply with a set of regulations. The location-compliant bill of materials 318 may specify parts that enable the completed product to comply with the set of regulations of the European Union, thereby enabling the manufacturer to sell products built using the location-compliant bill of materials 318 in the European Union.

Figure 4:
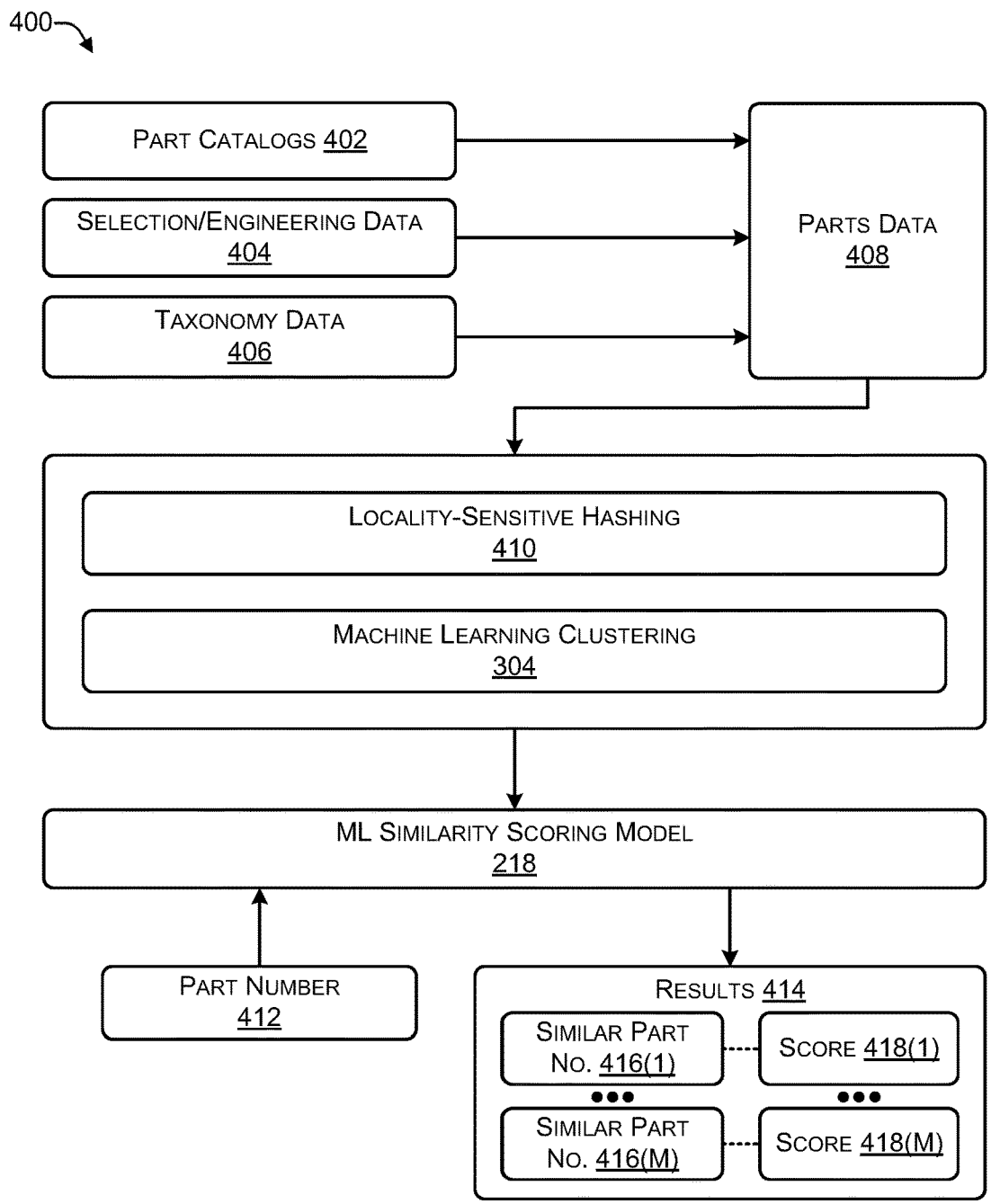
FIG. 4 is a block diagram of a system that uses a similarity scoring model to identify parts similar to a particular part, according to some embodiments.

FIG. 4 is a block diagram of a system 400 that uses a similarity scoring model to identify parts similar to a particular part, according to some embodiments. The system 400 illustrates how similar parts may be identified using a similarity score associated with each part.

Data from various part catalogs 402, selection/engineering data 404, and taxonomy data 406 may be gathered to create parts data 408. The selection/engineering data 404 may include which particular attributes were used to select a particular part for a particular product. For example, in a portable computing device, such as a laptop or a tablet, low power consumption may be an important attribute. Therefore, when selecting parts for a portable computing device, the selection/engineering data 404 may indicate that a relatively low power consumption attribute may be important and may be given more weight than other attributes, such as price, reliability, or the like.

A locality sensitive hashing algorithm 410 may be used to process the parts data 408. The locality sensitive hashing algorithm 410 may hash, using the parts data 408, similar parts into the same "buckets" with high probability. In this way, similar parts may end up in the same bucket. For example, a first part in the second part may be in the same bucket based on having the same capacity, the same form factor, the same size, the same pinout, the same capacity, and other similar (or same) attributes. The locality sensitive hashing for 410 and the machine learning clustering 304 may be used to create the similarity score 418 associated with each part number 416.

When the machine learning similarity scoring model 218 is provided a part number 142, the machine learning similarity scoring model 218 may provide results 414 in which each similar part number 416 is provided in the results 414 ordered in descending order based on a corresponding similarity score 418. For example, if the similarity score 418(M) is 100%, then the similar part number 416(M) may be 100% interchangeable with the part number 142. If the similarity score 418(M) is 80%, then the similar part number 416(M) may be interchangeable with the part number 142 approximately 80% of the time (e.g., in 80% of the products). For example, the part number 416 may be interchangeable when low power consumption is not a consideration for the product. The machine learning clustering 304 may group parts in such a way that parts in the same group (called a cluster) are more similar (e.g., based on the attributes of each part) to each other than to those in other groups (clusters).

Figure 5:
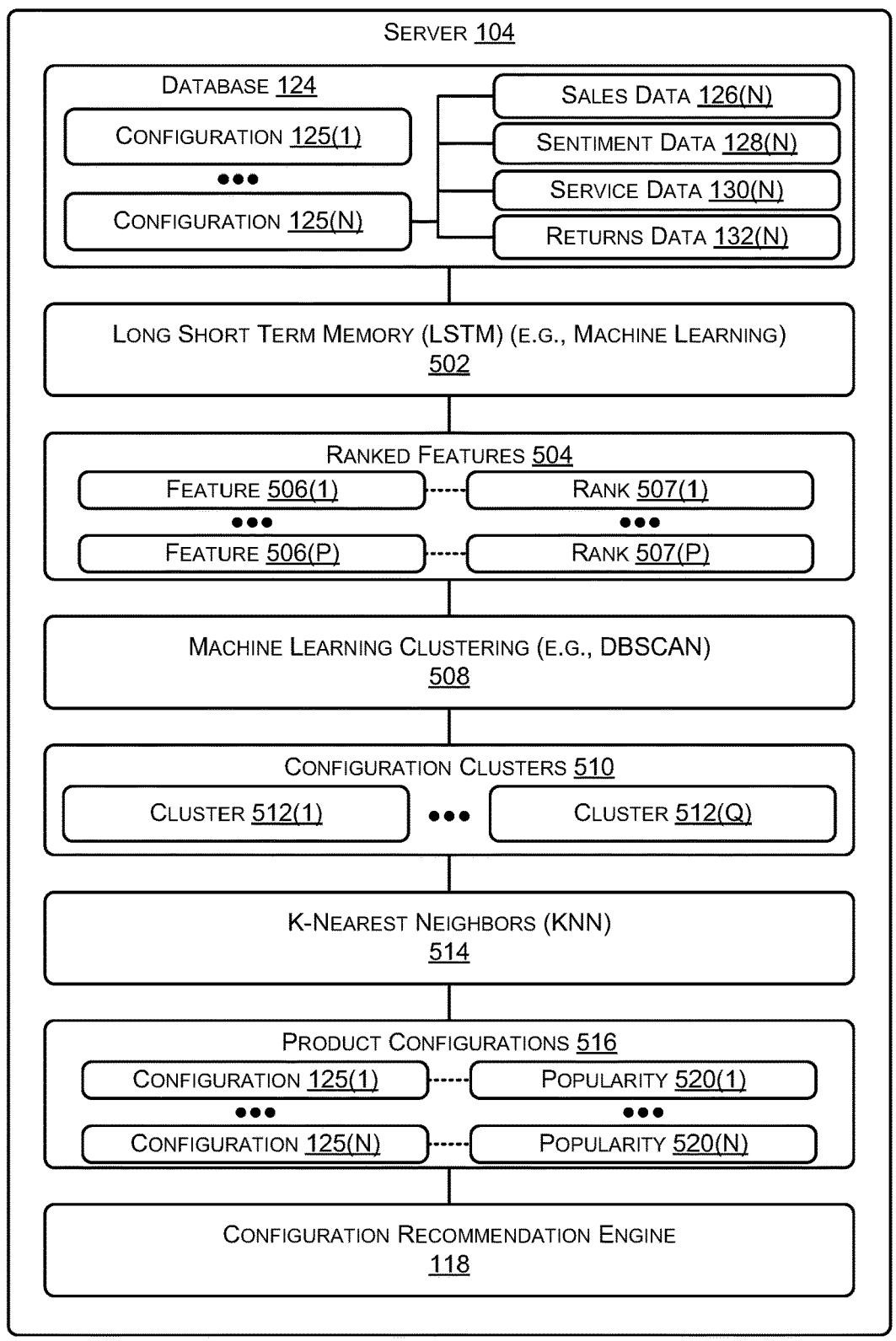
FIG. 5 is a block diagram of a system to identify popular product configurations, according to some embodiments.

FIG. 5 is a block diagram of a system 500 to identify popular product configurations, according to some embodiments. The data 126, 128, 130, 132 may be used as input to a Long Short Term Memory (LSTM) 502 machine learning module to perform deep learning to predict features 504 that includes features 506(1) to 506(P) with corresponding ranks 507(1) to 507(P), respectively. The features 506 may be ranked according to importance, with the feature 506(1) having the highest rank and the feature 506(P) having the lowest rank.

Machine learning clustering 508, such as, for example, Density-based spatial clustering of applications with noise (DBSCAN), may be used to group the configurations 125 into clusters to create configuration clusters 510, e.g., cluster 512(1) to 512(Q) (Q>0). For example, a first cluster may include configurations with the highest sales, a second cluster may include configurations with the highest reviews and/or positive comments, a third cluster may include configurations with a lowest return rate and/or service rate, and so on.

A K-nearest neighbors (KNN) 514 algorithm may be used on the configuration clusters 510 to classify the clusters 512. Each particular configuration 125 is classified by a plurality vote of neighbors, with the particular configuration being assigned to the class most common among its K-nearest neighbors (K is a positive integer, typically small). If K=1, then the configuration is assigned to the class of the single nearest neighbor. In some cases, weights may be assigned to the contributions of the neighbors, so that the nearer neighbors contribute more to the average than the more distant ones. For example, a common weighting scheme may give each neighbor a weight of 1/d, where d is the distance to the neighbor. The neighbors are taken from a set of configurations for which the class (e.g., cluster) is known. In this way, a most popular set of product configurations 516 in which the configurations 125 are ranked according to a popularity score 520.

FIG. 6 is an example of K-Nearest Neighbors (KNN) pseudocode 600, according to some embodiments. For KNN, the input includes the K-closest training examples in a feature space. The training examples may be vectors in a multidimensional feature space, with each vector having a class label. The training phase of the algorithm may include storing the feature vectors and class labels of the training samples. K is a user-defined constant, and an unlabeled vector (a query or test point) may be classified by assigning the label which is most frequent among the K-training samples nearest to that query point.

In the KNN pseudocode 600, data is loaded and the value of K is initialized. To determine the predicted class, the pseudo code 600 iterates from 1 to a total number of training data points. During each iteration, the distance between test data and each row of training data is calculated. For example, Euclidean distance may be used as the distance metric. Of course, other distance metrics, such as, for example, Chebyshev, cosine, or the like may be used. The calculated distances may be sorted in ascending order based on distance values. The top K rows may be retrieved from the sorted array, the most frequent class of the top K rows may be selected and returned as the predicted class.

FIG. 7 is an example of long short term memory (LSTM) pseudocode 700, according to some embodiments. Long short-term memory (LSTM) is an artificial recurrent neural network (RNN) architecture used in the field of deep learning. Unlike standard feedforward neural networks, LSTM has feedback connections and can not only process single data points, but also entire sequences of data.

Figure 8:
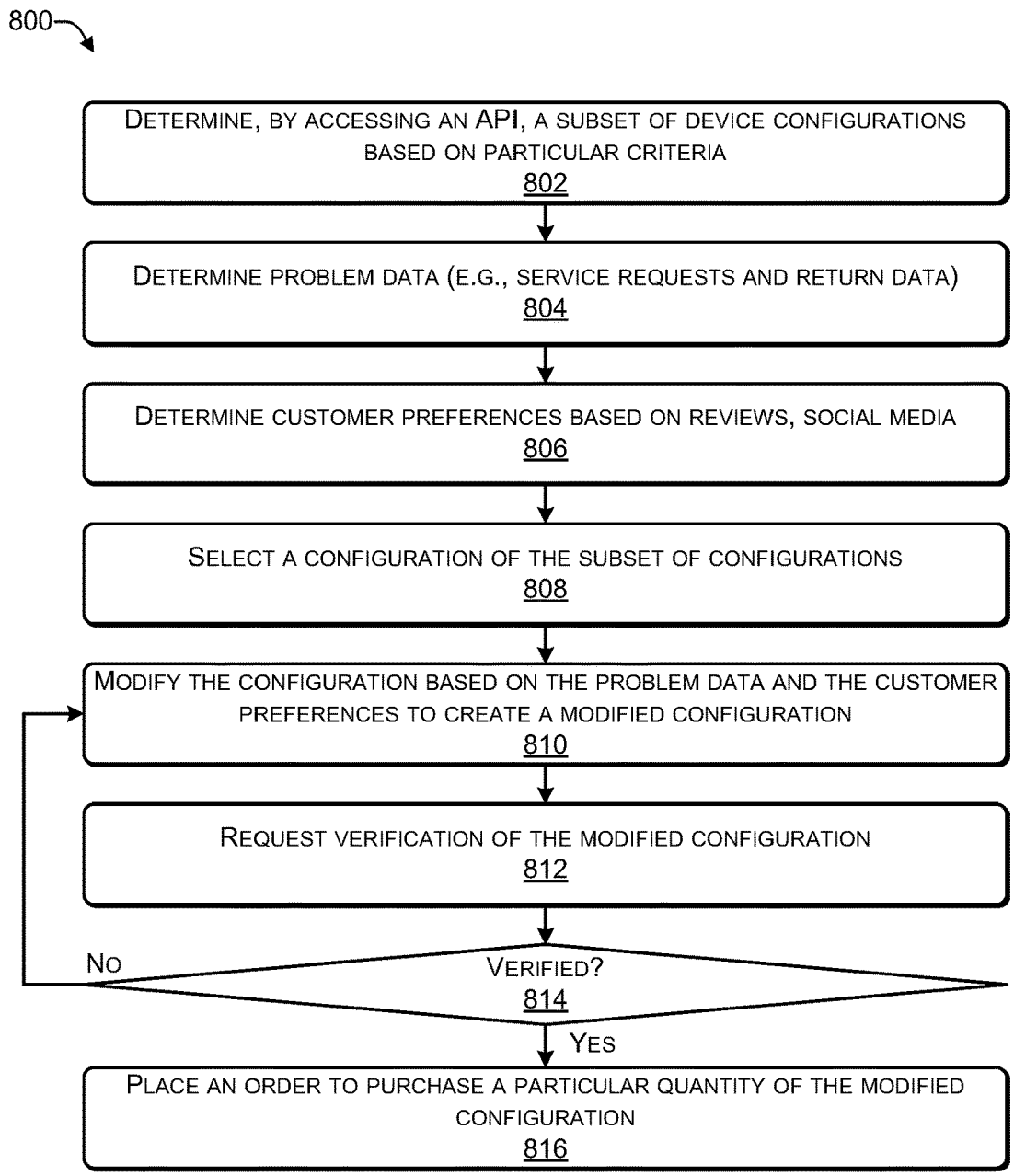
FIG. 8 is a flowchart of a process that includes placing an order via an API, according to some embodiments.

In the LSTM pseudocode 700, the LSTM modules may be imported, and input data extracted. The input data may be transformed/reshaped into time sequence vectors. The LSTM sequential model may be defined and layers added, activation and optimizer. The model may be fitted and then run FIG. 8 is a flowchart of a process 800 that includes placing an order via an API, according to some embodiments. The process 800 may be performed by one of the computing devices 102 (e.g., the configuration application 110) of FIG. 1.

At 802, the process may determine, using an API, a subset of device configurations based on particular criteria. For example, in FIG. 1, the channel partner 108(M) may use the configuration application 110(M) to access the API 112 and send the query 134 including the criteria 140. In response, the API 112 may provide the results 136 that include the subset 142 of the configurations 125 based on the criteria 140.

At 804, the process may determine problem data, such as service requests and return data. For example, in FIG. 1, the channel partner 108(M) may access the channel partner's own service requests and return data. The API 112 may enable the channel partner 108(M) to access the service data 130 and the returns data 132 associated with each of the configurations in the subset 142.

At 806, the process may determine customer preferences based on reviews posted on the channel partners website, social media, and the like. For example, in FIG. 1, the channel partner 108(M) may access sentiment data derived from comments and reviews posted on social media sites, including the channel partners own website. The API 112 may enable the channel partner 108(M) to access the sentiment data 128 associated with each of the configurations in the subset 142.

At 808, the process may select using the API a configuration of the subset of configurations. At 810, the process may modify using the API the configuration based on the problem data and the customer preferences to create a modified configuration. At 812, the process may request using the API verification of the modified configuration. If the process determines, at 814, that "no" the modified configuration was not verified then the process may proceed back to 810 where the process may make additional modifications to the configuration. If the process determines, at 814, that "yes" the modified configuration has been verified, then the process may proceed to place an order to purchase a particular quantity of the modified configuration using the API. For example, in FIG. 1, the channel partner 108(M) may use the configuration application 110(M) to make the selection 137 of a particular configuration of the subset 142 and provide modifications 138. The channel partner 108(M) may make the selection 137 of the configuration from the subset 142 and select the modifications 138 based on the sales data 126, the sentiment data 128, the service data 130, and the returns data 132. For example, the channel partner 108(M) may make the selection 137 to select a configuration that is in the top five best-selling laptops (e.g., the subset 142), has the lowest associated returns and service requests, and has received at least a threshold percentage (or number of) positive reviews, such as 90% or more 5 star reviews (e.g., 5 out of 5 stars). The API 112 may use the configuration validation module 114 to verify whether the modifications 138 can be made to the selection 137 and provide the validation results 122. If the validation results 122 indicate that the modifications 138 can be made to the selection 137 to build a computing device, then the channel partner 108(M) may place the order 144 for a quantity of the modified configuration. If the validation results 122 indicate that the modifications 138 cannot be made to the selection 137, the validation results 122 may include one or more suggestions on alternate modifications that could be performed to the selection 137. The channel partner 108(M) may revise the modifications 138 based on the suggestions and send the modifications 138 to the API 112 for verification. The channel partner 108(M) may repeat this process of revising the modifications 138 until the validation results 122 indicate that the modifications 138 can be performed to the selection 137 to build the desired computing device.

Thus, a channel partner may use a configuration application to access, via an API, sales data, sentiment data, service data, and returns data, associated with multiple configurations that are available from the manufacturer of computing devices. The channel partner may specify one or more criteria to filter the configurations to identify a subset of the configurations that satisfy the criteria. For example, the criteria may include identifying the best-selling laptop configurations in a particular time period, in a particular location, in a particular price range that have a profit margin greater than a threshold amount, and that have service requests and returns less than a threshold percentage of the total number of configurations sold. The channel partner may select one configuration from the subset of the configurations and make modifications to the configuration based on the service requests, the returns, and sentiment data, such as reviews posted on the Internet (e.g., the channel partner's website, the manufacturer's website, and the like). The API may enable the channel partner to validate the modified configuration, e.g., to determine whether the modified configuration can be built. After validating the modified configuration, the channel partner may place an order for a quantity of the modified configuration to be built. In this way, the channel partner has access to a much larger quantity of data (e.g., sales data, sentiment data, service data and returns data) by accessing the manufacturer's data rather than just the channel partner's own data. Thus, the API provides the channel partner with more options to configure a particular product, such as a computing device.

Figure 9:
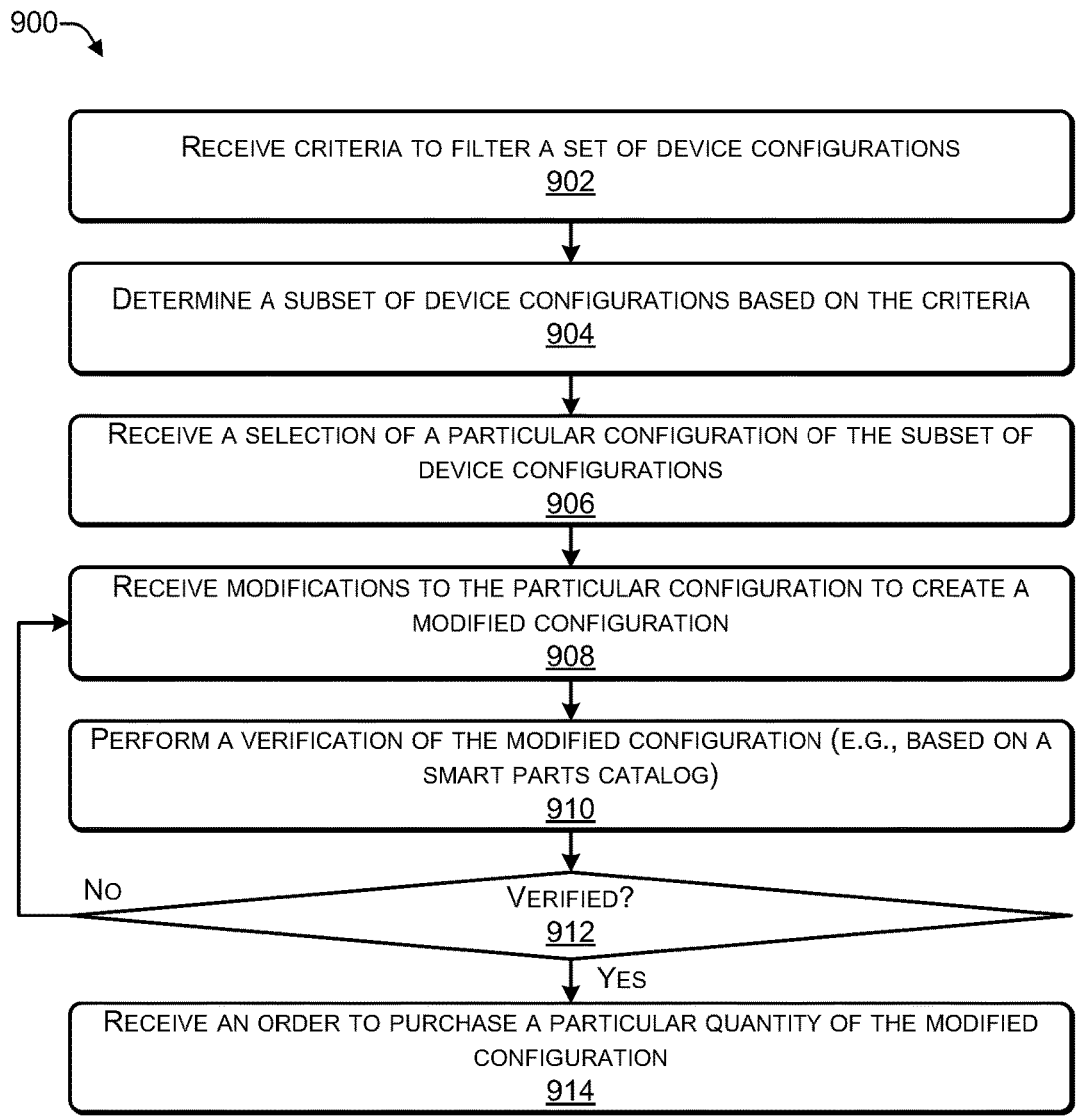
FIG. 9 is a flowchart of a process that includes receiving an order via an API, according to some embodiments.

FIG. 9 is a flowchart of a process 900 that includes receiving an order via an API, according to some embodiments. The process 900 may be performed by the server 104 (e.g., the API 112) of FIG. 1.

At 902, the process may receive criteria, from a channel partner, to filter a set of device configurations. At 904, the process may determine a subset of device configurations based on the criteria. For example, in FIG. 1, the server 104 may receive the query 134 from the channel partner 108(M) that includes the criteria 140. Based on the criteria 140, the server 104 may identify, from the configurations 125 in the database 124, the results 136 that include the subset 142 of the configurations 125.

At 906, the process may receive a selection of a particular configuration of the subset of device configurations. At 908, the process may receive one or more modifications to the particular configuration to create a modified configuration. At 910, the process may perform a verification of the modified configuration to verify whether the modified configuration can be built. If a determination is made, at 912 that "no" the modified configuration was not verified, then the process may proceed to 908 to receive additional modifications to the particular configuration. If a determination is made at 912 that "yes" the modified configuration was verified (e.g., as being buildable), then the process may proceed to 914, where the process may receive an order to purchase a particular quantity of the modified configuration. For example, in FIG. 1, the server 104 may receive the selection 137 from the channel partner 108(M) selecting a particular configuration in the subset 142 of the configurations 125. The server 104 may receive one or more modifications 138 to the particular configuration. The server 104 may use the configuration validation module 114 to verify whether the modified configuration can be built. The server 104 may send the validation results 122 to the channel partner 108(M). If the configuration validation module 114 was able to verify that the modified configuration can be built, then the validation results 122 may indicate that the modified configuration can be built. If the configuration validation module 114 determines that the modified configuration cannot be built, then the validation results 122 may indicate that the modified configuration cannot be built and may provide one or more suggestions, including additional modifications to the particular configuration, to create a modified configuration that can be built. After the validation results 122 indicate that the modified configuration can be built, the server 104 may receive the order 144 to manufacture a particular number of the modified configuration. The channel partner 108(M) may sell the ordered computing devices.

Thus, an API hosted by a server may enable a channel partner to identify a subset of available configurations based on one or more criteria. For example, they channel partner may identify the highest selling computing device in a particular time period, in a particular location, having a profit margin of at least a particular threshold, having returns and service requests less than the threshold percentage, and having one or more features identified by customers on social media as desirable. In this way, the channel partner has access to a larger pool of data, e.g., the manufacturer's data, rather than just the channel partner's data to enable the channel partner to specify product configurations to meet specific criteria.

Figure 10:
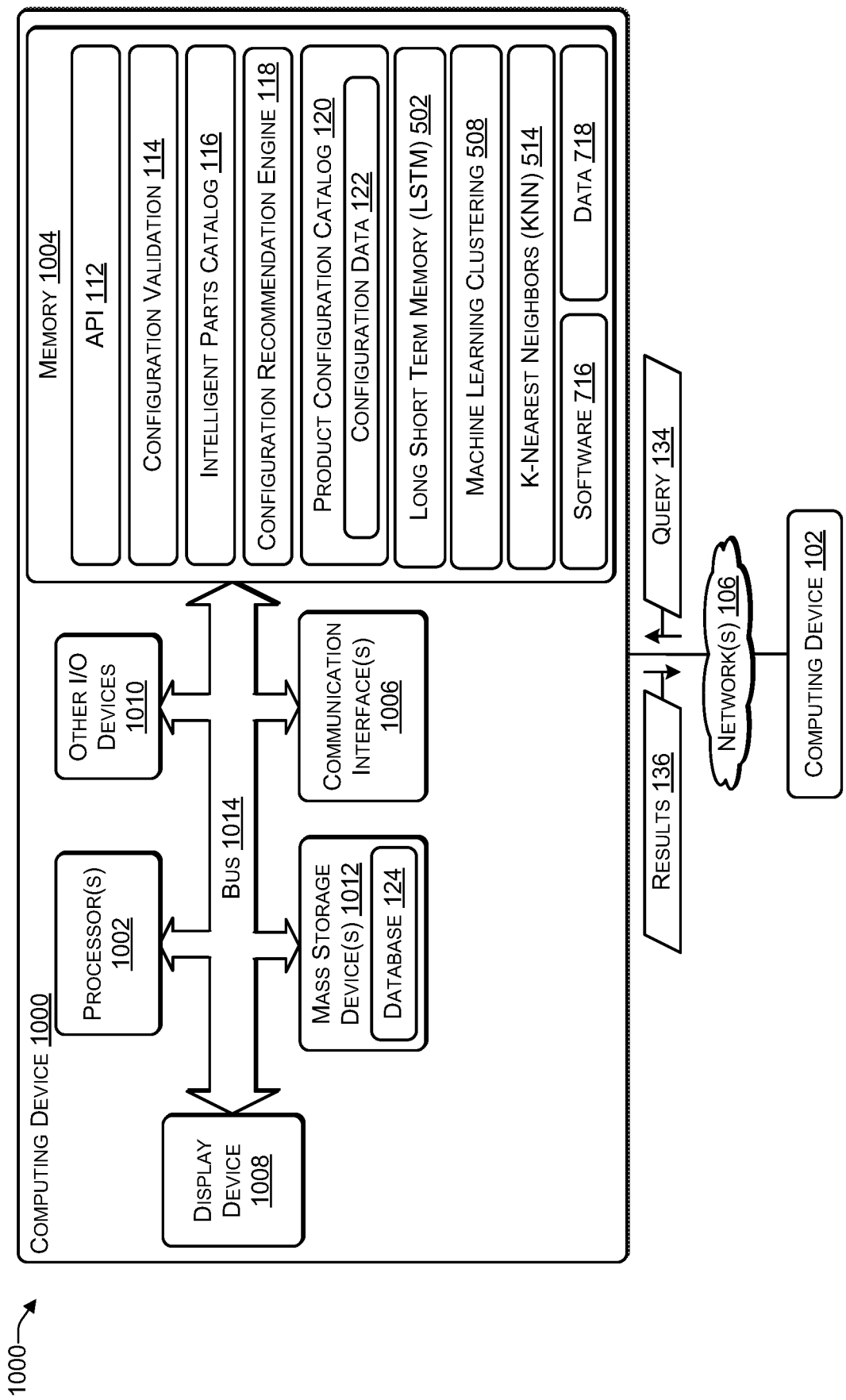
FIG. 10 illustrates an example configuration of a computing device that can be used to implement the systems and techniques described herein.

FIG. 10 illustrates an example configuration of a computing device 1000 that can be used to implement the systems and techniques described herein, such as for example, the server 104 (or one of the computing devices 102) of FIG. 1.

The computing device 1000 may include one or more processors 1002 (e.g., including a central processing unit (CPU), a graphics processing unit (GPU), or the like), a memory 1004, communication interfaces 1006, a display device 1008, other input/output (I/O) devices 1010 (e.g., a keyboard, a trackball, and the like), and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated with a CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The computing device 1000 may include one or more communication interfaces 1006 for exchanging data via the network 106. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a printer, audio input/output devices, and so forth.

The computer storage media, such as memory 1004 and mass storage devices 1012, may be used to store software and data. For example, the computer storage media may be used to store the configuration validation module 114, the intelligent parts catalog 116, the configuration recommendation engine 118, the product configuration catalog 120, the LSTM 502, the machine learning clustering (e.g., DBSCAN) 508, KNN 514, the database 124, other software 716, and other data 718.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   accessing, by a computing device, an applications programming interface (API) hosted by a server;
   providing, by the computing device to the API, one or more criteria to filter a set of configurations;
   receiving, by the computing device from the API, a subset of the set of configurations, the subset determined based at least in part on the one or more criteria;
   receiving a selection, by the computing device, of a particular configuration of the subset;
   receiving, by the computing device, a modification to the particular configuration;
   creating, by the computing device, a modified configuration based on the particular configuration;
   providing, by the computing device to the API, the modified configuration;
   requesting, by the computing device using the API, verification that the modified configuration is buildable; and
   placing, by the computing device to the API, an order to manufacture a particular quantity of the modified configuration.

2. The computer-implemented method of claim 1, wherein:
   the particular configuration is associated with one of a desktop computing device, a laptop computing device, or a tablet computing device, a 2-in-1 computing device.

3. The computer-implemented method of claim 1, further comprising:
   determining service requests associated with the particular configuration, wherein the modification to the particular configuration is based at least in part on the service requests.

4. The computer-implemented method of claim 1, further comprising:
   determining return data associated with the particular configuration, wherein the modification to the particular configuration is based at least in part on the return data.

5. The computer-implemented method of claim 1, further comprising:
determining sentiment data associated with the particular configuration, wherein the sentiment data is determined based on comments posted on one or more review sites, and wherein the modification to the particular configuration is based at least in part on the sentiment data.

6. The computer-implemented method of claim 1, wherein the one or more criteria comprises at least one of:
a particular time period comprising a start date and an end date;
a price range comprising a lowest price and a highest price;
a particular location comprising a postal code, a county, a city, a state, or a country;
a profit margin; or
a number of units sold.

7. The computer-implemented method of claim 1, wherein the modified configuration specifies that:
a first particular part be excluded from the particular configuration based at least in part on one or more issues associated with the first particular part, the one or more issues determined based on analyzing service request data and product returns data; and
a second particular part be included in the particular configuration based at least in part on one or more features provided by the second particular part.

8. A computing device comprising:
one or more processors; and
one or more non-transitory computer readable media to store instructions executable by the one or more processors to perform operations comprising:
accessing an applications programming interface (API) hosted by a server;
providing, using the API, a set of criteria to filter a set of configurations;
receiving, from the API, a subset of the set of configurations, the subset determined based at least in part on the set of criteria;
receiving a selection of a particular configuration of the subset;
receiving a modification to the particular configuration;
creating a modified configuration based on the modification;
requesting, using the API, verification that the modified configuration is buildable;
determining, using the API, that the modified configuration is buildable; and
placing, using the API, an order to manufacture a particular quantity of the modified configuration.

9. The one or more non-transitory computer readable media of claim 8, further comprising:
receiving, from the API, a second subset of the set of configurations determined based at least in part on a second set of criteria;
receiving a second selection of a second particular configuration of the subset;
receiving a second modification to the second particular configuration;
creating a second modified configuration based on the second modification;
requesting, using the API, verification of the second modified configuration;
determining, from the API, that the modified configuration is unbuildable;
receiving an additional modification to the second particular configuration;
creating an additional modified configuration based on the additional modification;
requesting, using the API, verification of the additional modified configuration; and
determining, from the API, that the additional modified configuration is buildable.

10. The one or more non-transitory computer readable media of claim 8, further comprising:
determining service requests associated with the particular configuration;
determining return data associated with the particular configuration; and
determining sentiment data associated with the particular configuration, wherein the sentiment data is determined based on comments posted on one or more review sites; and
wherein the modification to the particular configuration is based at least in part on one or more of:
the service requests;
the return data; or
the sentiment data.

11. The one or more non-transitory computer readable media of claim 8, wherein the set of criteria comprises at least one of:
a particular time period comprising a start date and an end date;
a price range comprising a lowest price and a highest price;
a particular location comprising a postal code, a county, a city, a state, or a country;
a profit margin; or
a number of units sold.

12. The one or more non-transitory computer readable media of claim 8, wherein:
the modified configuration specifies that a particular part be excluded from the particular configuration based at least in part on one or more issues associated with the particular part, the one or more issues determined based on analyzing service request data and product returns data.

13. The one or more non-transitory computer readable media of claim 8, wherein:
the modified configuration specifies that a particular part be included in the particular configuration based at least in part on one or more features provided by the particular part.

14. A server comprising:
one or more processors; and
one or more non-transitory computer readable media to store instructions executable by the one or more processors to perform operations comprising:
receiving from a computing device associated with a channel partner, via an applications programming interface (API), one or more criteria to filter a set of configurations;
determining a subset of the set of configurations, the subset determined based at least in part on the one or more criteria;
receiving, via the API, a selection of a particular configuration of the subset;
receiving, via the API, a modification to the particular configuration to create a modified configuration;
determining, using a configuration verification module, that the modified configuration is buildable; and
receiving, via the API, an order to manufacture a particular quantity of the modified configuration.

15. The server of claim 14, further comprising:
performing, using a long short term memory (LSTM) machine learning module, an analysis of the set of configurations to identify a set of features.

16. The server of claim 15, further comprising:
clustering, using density-based spatial clustering of applications with noise (DBSCAN), the set of features to create a plurality of configuration clusters based at least in part on:
- a number of sales of individual configurations of the set of configurations;
- product reviews of the individual configurations;
- service request data associated with the individual configurations; and
- product return data associated with the individual configurations.

17. The server of claim 16, further comprising:
performing, using a K-nearest neighbors algorithm, an analysis of the plurality of configuration clusters; and determining, based on the analysis, a predetermined number of bestselling configurations.

18. The server of claim 17, wherein:
the subset includes at least one bestselling configuration from the predetermined number of bestselling configurations.

19. The server of claim 14, wherein:
the modified configuration specifies that a particular part be excluded from the particular configuration based at least in part on one or more issues associated with the particular part, the one or more issues determined based on analyzing service request data and product returns data.

20. The server of claim 14, wherein:
the modified configuration specifies that a particular part be included in the particular configuration based at least in part on one or more features provided by the particular part.

* * * * *